Aug. 3, 1954        A. M. CASABONA        2,685,688
NULL TYPE GLIDE PATH SYSTEM
Filed Nov. 20, 1952

BASIC ARRAY PATTERN

FILL IN ARRAY PATTERN

RESULTANT FILL IN SIGNAL

INVENTOR
ANTHONY M. CASABONA

BY
Ernest Fanwick
ATTORNEY

Patented Aug. 3, 1954

2,685,688

UNITED STATES PATENT OFFICE 2,685,688

NULL TYPE GLIDE PATH SYSTEM

Anthony M. Casabona, Hawthorne, N. Y., assignor to International Telephone and Telegraph Corporation, a corporation of Maryland Application November 20, 1952, Serial No. 321,630

8 Claims. (Cl. 343—108)

This invention relates to an improved null type glide path system in which the glide path course ambiguities are substantially eliminated.

In order to provide an instrument landing system for guiding an aircraft to a safe landing, many different types of systems have been proposed. The type which gives the best positive guiding indications is one using a comparison of two signals to define a course. However, known basic null type glide path systems present ambiguous course indications because the two radiated signals create null indications above the desired course path.

One of the objects of this invention, therefore, is to provide means to produce a null type glide path system which substantially eliminates course ambiguity.

Another object of my invention is to provide a null type glide path system of simple design and with a sharply defined course in which there is a minimum danger of producing false course indications and in which a minimum amount of additional equipment is required to eliminate the false course indications.

According to a feature of my invention, sideband energy, in which two signals are in opposite phase with respect to one another, is produced. The basic null type glide path antenna array is supplemented by the addition of two antennas emitting only sideband energy to fill in the ambiguous false course indications created by the basic null type glide path antenna array.

The above-mentioned and other features and objects of this invention will become more apparent by reference to the following description taken in conjunction with the accompanying drawings, in which.

Figure 1:
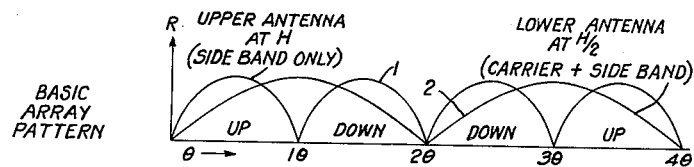
Fig. 1 is a graphic illustration of the signal strength R plotted as a function of elevation angle for the antenna array of the prior art null type glide path system.

The basic null type glide path instrument landing system utilizes an antenna structure of the so-called vertical type to set up radiation fields suitable for instrument landing purposes. The usual antenna structure comprises two antennas, one disposed above the other, in which the lower antenna radiates a carrier frequency plus balanced sidebands of two audio modulations usually 90 and 150 C. P. S. while the upper antenna radiates the balanced sidebands only in phase opposition to the sidebands radiated by the lower antenna, and the desired glide path position $\theta$ occurs at the null position of the resulting radiation pattern. As shown in Fig. 1, if the upper antenna is at a height H above the ground and radiates balanced sidebands only, the antenna pattern may be plotted as a function of signal strength R vs. elevation angle $\theta$ and may be represented by curve 1. The lower antenna at a height ½H above ground radiating carrier frequency plus balanced sidebands in phase opposition with the balanced sidebands radiated by the upper antenna may have its radiation curve represented by curve 2. It is seen from the graphic illustration of Fig. 1 that in addition to the true glide path angle 1$\theta$, there are also false or ambiguous glide positions at 2$\theta$, 3$\theta$, 4$\theta$, etc.

Figure 2:
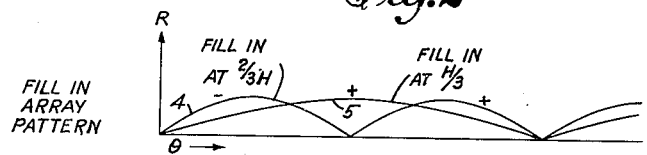
Fig. 2 is a graphic illustration of the signal strength R plotted as a function of elevation angle $\theta$ for the fill-in antenna array of this invention.

I have discovered that when an additional fill-in antenna array is added to the basic antenna array of the null type glide path system and the antennas of the fill-in array are situated at ⅔ and ⅓ of the height of the upper antenna of the basic array, a desirable fill-in pattern is obtained by feeding these antennas cophasally down signal only, that is, the signal fed to the fill-in antennas will be in phase with the second lobe of the pattern due to the basic array. Thus, as shown in Fig. 2, the antenna situated at ⅔H will radiate a pattern, such as shown by curve 4, when its signal strength R is plotted as a function of elevation angle $\theta$. The fill-in antenna situated at ⅓H will radiate a pattern such as illustrated by curve 5. Since the antennas are fed antiphasally, the first lobe of curve 4 will be of a negative phase, while the first lobe of curve 5 will be positive.

Figure 3:
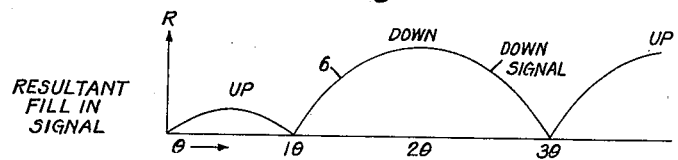
Fig. 3 is a graphic illustration of the resultant fill-in antenna array pattern of the antenna patterns illustrated in Fig. 2.

Referring to Fig. 3, the resultant signal pattern due to the radiation from the fill-in antenna array is represented by curve 6. The resultant pattern 6 of the array has a zero signal at the desired path angle 1$\theta$ while a maximum signal is produced at twice the glide path angle 2$\theta$. Below the glide path angle 1$\theta$ the signal due to the fill-in antenna is sufficiently small so as to produce no appreciable effect. Under these conditions the phase or magnitude of the fill-in signal cannot alter the glide path position. At twice the glide path angle, where no basic array signal exists, the phase of the fill-in signal with respect to the basic array may be anything. Above and below $2\theta$, however, "flydown" signal already exists, and the phase must be adjusted so as not to decrease the indication. Hence, for minimum and equal effects in these two areas, the fill-in phase is adjusted to be 90° with respect to the basic array.

Figure 4:
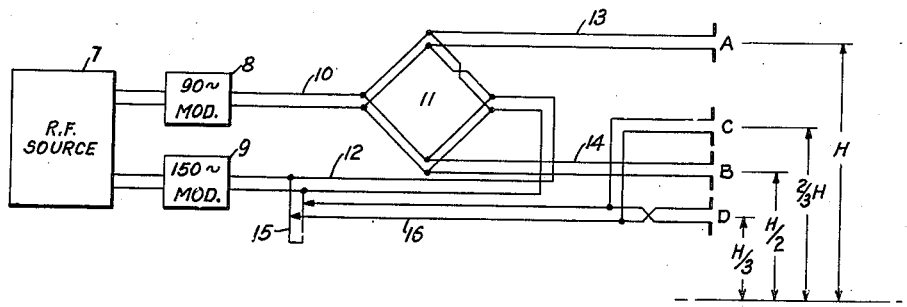
Fig. 4 is a schematic diagram in block form of one embodiment of the transmitter circuity utilized to obtain the improved null type glide path pattern in accordance with the principles of this invention.

Fig. 4 is one embodiment of a relatively simple circuit for obtaining the antenna patterns shown in Figs. 1, 2, and 3. A carrier frequency is supplied from radio frequency source 7 to audio frequency modulators 8 and 9. The modulated carrier frequency from 90 C. P. S. modulator 8 is fed over line 10 to one terminal of conjugate network 11. The 150 C. P. S. modulated carrier frequency is supplied over line 12 to an opposite terminal of conjungate network 11. The output of conjugate network 11 taken from opposite terminals is fed over lines 13 and 14 to antennas A and B, respectively. The energy fed to antenna A comprises the sideband energy composed of the 90 and 150 C. P. S. signals while the energy coupled to antenna B comprises the carrier frequency plus side band energy at both audio frequencies. Amplitude central unit 15 couples a portion of the energy output from modulator 9 to antennas C and D over line 16. Antennas C and D are located at ⅔ the height and ⅓ the height of antenna A above ground. The energy fed over line 16 to antennas C and D comprises the carrier frequency plus the 150 C. P. S. modulation from modulator 9. Amplitude control unit 15 is provided to control the amount of energy radiated from fill-in antennas C and D. It is, of course, understood that the embodiment shown in Fig. 4 is a relatively simple circuit and that additional bridge circuits may be added to prevent any interaction between the energy fed to fill-in apparatus and the basic array. It will also be understood by those skilled in this art that my invention will be equally effective in a null type glide path system using a phase comparison of two signals of the same frequency as well as in the equisignal type glide path system described.

While I have described above the principles of my invention in connection with specific apparatus, it is to be clearly understood that this description is made only by way of example and not as a limitation to the scope of my invention as set forth in the objects thereof and in the accompanying claims.

I claim:

1. Glide path apparatus for instrument landing of aircraft comprising first antenna means and second antenna means disposed generally one above the other, a source of carrier frequency energy, first means to modulate said carrier frequency energy with a first given frequency and second means to modulate said carrier frequency energy with a second given frequency to produce sideband energy, means to couple said carried energy and said sideband energy to said second antenna means, third antenna means disposed generally between said first and second antenna means, and fourth antenna means disposed below said first, second, and third antenna means, and means to couple said carrier energy modulated by one of said given frequencies to said third and fourth antenna means.

2. Glide path apparatus according to claim 1, wherein said second antenna means are disposed generally above said first antenna means.

3. Glide path apparatus according to claim 1, wherein said means to couple energy to said third and fourth antenna means further includes means to control the amplitude of said coupled energy.

4. Glide path apparatus according to claim 1, wherein said means to couple energy to said first and second antenna means includes a conjugate network.

5. Glide path apparatus according to claim 1, wherein said first antenna means is disposed substantially ½ the height of said second antenna means above ground.

6. Glide path apparatus according to claim 5, wherein said third antenna means is disposed substantially ⅔ the height of said second antenna means above ground.

7. Glide path apparatus according to claim 5, wherein said fourth antenna means is disposed substantially ⅓ the height of said second antenna means above ground.

8. Glide path apparatus for instrument landing of aircraft comprising first antenna means, second antenna means disposed generally above said first antenna means, a source of carrier frequency energy, means to divide said carrier frequency energy, means to modulate each of said divided energy portions with a different audio frequency signal, a conjugate network, means to couple each of the modulated carrier frequency energies to an opposite terminal of said conjugate network, means to couple sideband energy from a third terminal of said conjugate network to said first antenna means, means to couple carrier frequency energy and sideband energy from a fourth terminal of said conjugate network to said second antenna means, third and fourth antenna means generally disposed respectively above and below said second antenna means, and means to couple a portion of the carrier frequency energy modulated by one of said audio frequency signals to said third and fourth antenna means.

References Cited in the file of this patent

UNITED STATES PATENTS

| Number | Name | Date |
| --- | --- | --- |
| 2,406,876 | Watts | Sept. 3, 1946 |